(12) United States Patent
Guzman-Magana et al.

(10) Patent No.: US 11,702,151 B2
(45) Date of Patent: Jul. 18, 2023

(54) AERODYNAMIC VEHICLE SIDE STEP

(71) Applicants: Arturo Guzman-Magana, Windsor (CA); Santiago Antonelli, Lake Orion, MI (US); Shawn Miller, Clinton Township, MI (US); Robert J May, Commerce, MI (US)

(72) Inventors: Arturo Guzman-Magana, Windsor (CA); Santiago Antonelli, Lake Orion, MI (US); Shawn Miller, Clinton Township, MI (US); Robert J May, Commerce, MI (US)

(73) Assignee: FCA US LLC, Auburn Hills, MI (US)

( * ) Notice: Subject to any disclaimer, the term of this patent is extended or adjusted under 35 U.S.C. 154(b) by 232 days.

(21) Appl. No.: 17/109,334

(22) Filed: Dec. 2, 2020

(65) Prior Publication Data

US 2022/0169323 A1 Jun. 2, 2022

(51) Int. Cl.
*B60R 3/00* (2006.01)
*B62D 35/00* (2006.01)

(52) U.S. Cl.
CPC .............. *B62D 35/008* (2013.01); *B60R 3/00* (2013.01)

(58) Field of Classification Search
CPC ................................ B60R 3/00; B60R 35/008
See application file for complete search history.

(56) References Cited

U.S. PATENT DOCUMENTS

| D716,211 S | * | 10/2014 | Jensen | D12/196 |
| 2006/0208449 A1 | | 9/2006 | Kuo et al. | |
| 2014/0062074 A1 | * | 3/2014 | Higgins | B60R 3/00 |
| | | | | 280/762 |
| 2015/0123373 A1 | * | 5/2015 | Meszaros | B60R 3/002 |
| | | | | 280/164.1 |
| 2019/0291791 A1 | * | 9/2019 | Nishida | B62D 35/008 |

FOREIGN PATENT DOCUMENTS

JP        3735900 B2    1/2006

* cited by examiner

*Primary Examiner* — Bryan A Evans
(74) *Attorney, Agent, or Firm* — Jeremy J. Klobucar

(57) ABSTRACT

A side step for a vehicle includes an inner side coupled to or adjacent to a vehicle body, an outer side, a top side, a bottom side, a front end and a rear end, where the front end is adapted to be arranged closer to a front of a vehicle than the rear end. An air guide is provided at one or both of the front end and the rear end, the air guide projects outwardly relative to a central portion of the side step that is spaced from the air guide, and the air guide projects outwardly from one or both of the top side and bottom side, and the air guide is thicker, in a vertical direction, at said one or both of the front end and rear end than is the air guide at a location between the front end and rear end.

20 Claims, 3 Drawing Sheets

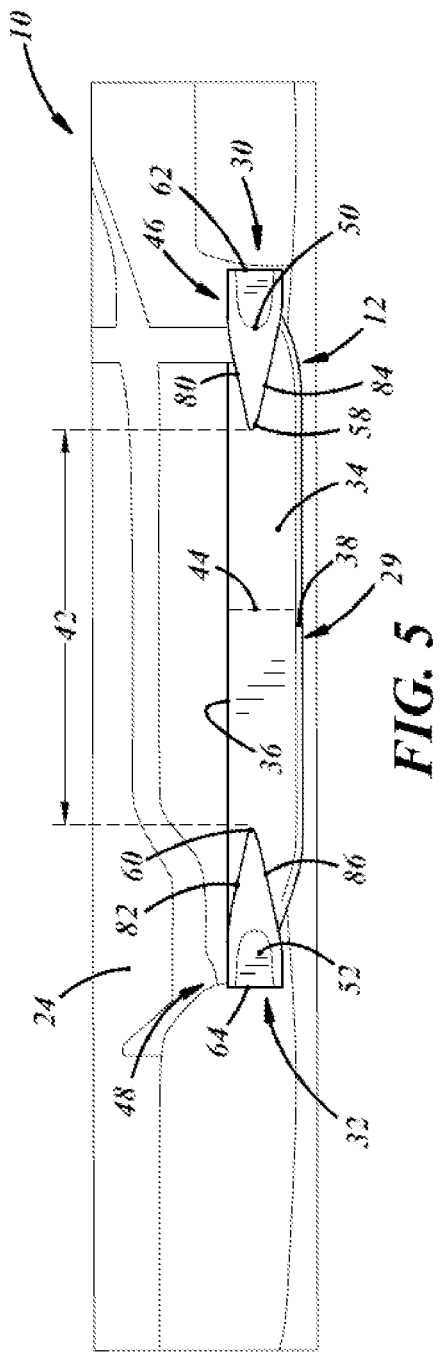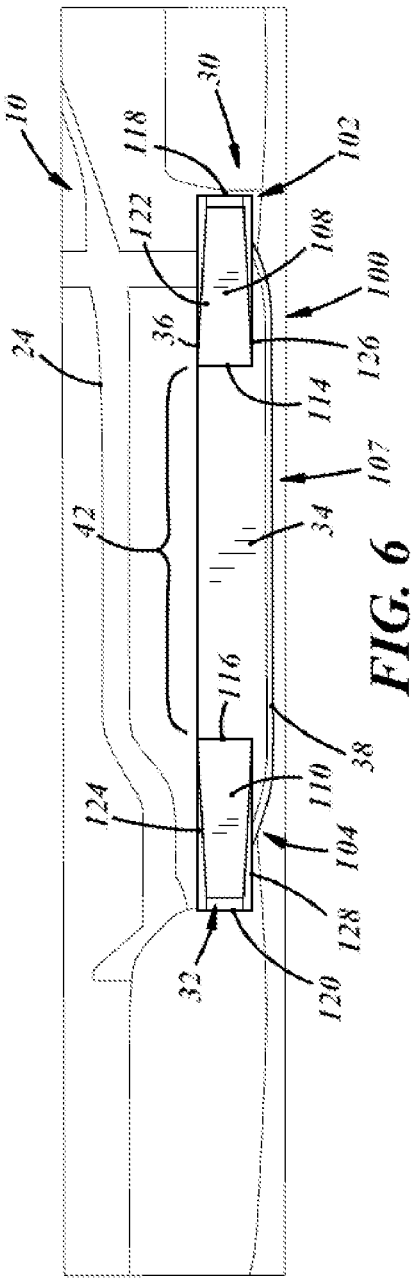

AERODYNAMIC VEHICLE SIDE STEP

FIELD

The present disclosure relates to a side step for a vehicle.

BACKGROUND

Some vehicles include a side step along a lower portion of the vehicle, beneath doors of the vehicle. The side step may be decorative or it may provide a step to assist a person entering and exiting a vehicle. The side steps can cause turbulent air flow patterns and do not efficiently manage airflow relative to the vehicle wheels, when the vehicle is in motion, and the turbulent air flow can create resistance that impedes vehicle travel and increases fuel or energy consumption.

SUMMARY

In at least some implementations, a side step for a vehicle includes a main body having an inner side adapted to be coupled to or adjacent to a vehicle body, an outer side opposite to the inner side, a top side, a bottom side opposite to the top side and in assembly on the vehicle arranged facing a ground surface, a front end and a rear end, where the front end is adapted to be arranged closer to a front of a vehicle than the rear end. An air guide is provided at one or both of the front end and the rear end, t the air guide projects outwardly from one or both of the top side and bottom side relative to a central portion of the side step that is spaced from the air guide, and the air guide is thicker, in a direction perpendicular to the centerline, at said one or both of the front end and rear end than is the air guide at a location between the front end and rear end.

In at least some implementations, the air guide is provided at the rear end of the main body and the air guide extends downwardly from the bottom side, and a lower surface of the air guide at an inward end, that is located spaced from the rear end of the main body, is closer to the top side of the main body than is the lower surface of the air guide at an outward end at the rear end of the main body. In at least some implementations, the air guide also extends upwardly from the top side, and an upper surface of the air guide at the inward end is closer to the bottom side of the main body than is the upper surface of the air guide at the outward end.

In at least some implementations, the air guide is provided at the front end of the main body and the air guide extends downwardly from the bottom side, and a lower surface of the air guide at an inward end located spaced from the front end of the main body is closer to the top side of the main body than is the lower surface of the air guide at an outward end at the front end of the main body. In at least some implementations, the air guide also extends upwardly from the top side, and an upper surface of the air guide at the inward end is closer to the bottom side of the main body than is the upper surface of the air guide at the outward end.

In at least some implementations, the air guide has an inward end located between the front end of the main body and the rear end of the main body, and an outward end that defines either the front end of the main body or the rear end of the main body, and a longitudinal length of the air guide between the inward end and outward end is less than 40% of the length of the main body.

In at least some implementations, the air guide has an inward end located between the front end of the main body and the rear end of the main body, and an outward end that defines either the front end of the main body or the rear end of the main body, and wherein the inward end has a smaller width, measured in a direction extending between the inner side and outer side of the main body, than does the outward end. In at least some implementations, the inward end is between 5% and 50% of the width of the outward end.

In at least some implementations, the air guide is formed integrally with and in the same material as the main body. In at least some implementations, the air guide is formed separately from and is connected to the main body.

In at least some implementations, two separate air guides are provided with a first air guide at the front end of the main body and extending part of the way toward the rear end of the main body, and a second air guide at the rear end of the main body and extending part of the way toward the front end of the main body, and the side step has a central portion between the first air guide and second air guide that has a thickness less than the maximum thickness of either air guide.

In at least some implementations, a vehicle includes a vehicle body, a front wheel coupled to the vehicle body for rotation relative to the vehicle body, a rear wheel coupled to the vehicle body for rotation relative to the vehicle body, the rear wheel being spaced from the front wheel and a side step coupled to the vehicle body and located between the front wheel and rear wheel. The side step has an inner side adjacent to and facing the vehicle body, an outer side opposite to the inner side, a top side, a bottom side opposite to the top side, a front end nearer to the front wheel than the rear wheel, and a rear end nearer the rear wheel than the front wheel. The side step has a thicker portion that is thicker, in a direction perpendicular to the bottom surface, at one or both of the front end and rear end than is the side step at a location between the front end and rear end.

In at least some implementations, a portion of the bottom side of the side step, at one or both of the rear end of the side step and the front end of the side step, includes an angled surface that is at a non-zero angle to the bottom side of the side step in a central portion of the side step, wherein the central portion is located between the front end and rear end and is arranged to be generally parallel to the ground surface.

In at least some implementations, a portion of the top side of the side step, at one or both of the rear end of the side step and the front end of the side step, includes an angled surface that is at a non-zero angle to the top side of the side step in a central portion of the side step, wherein the central portion is located between the front end and rear end. In at least some implementations, the angled surface has an inward end located between the front end of the side step and the rear end of the side step, and an outward end that defines either the front end of the side step or the rear end of the side step, and wherein the inward end has a smaller width, measured in a direction extending between the inner side and outer side of the side step, than does the outward end.

In at least some implementations, the thicker portion is at the front end of the side step and extends less than 40% of a length of the side step measured between the front end and rear end. In at least some implementations, the thicker portion is at the rear end of the side step and extends less than 40% of a length of the side step measured between the front end and rear end.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 5 is a bottom view of the side step and adjacent portion of the vehicle;

FIG. 6 is a bottom view of an alternate side step and adjacent portion of the vehicle.

DETAILED DESCRIPTION

Figure 1:
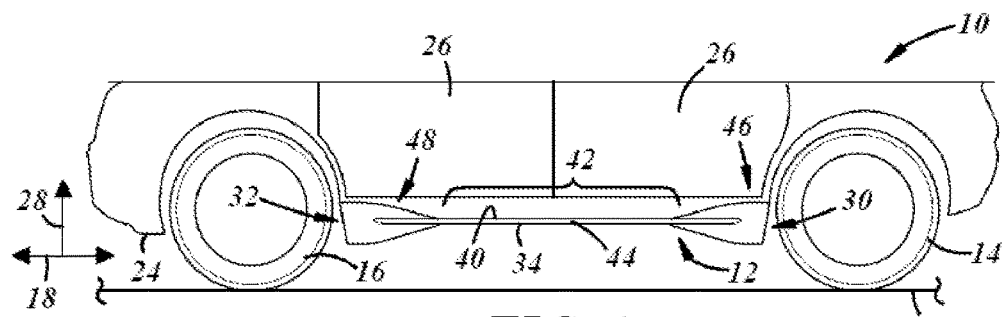
FIG. 1 is a side view of a lower portion of a vehicle including a side step.
Figure 2:
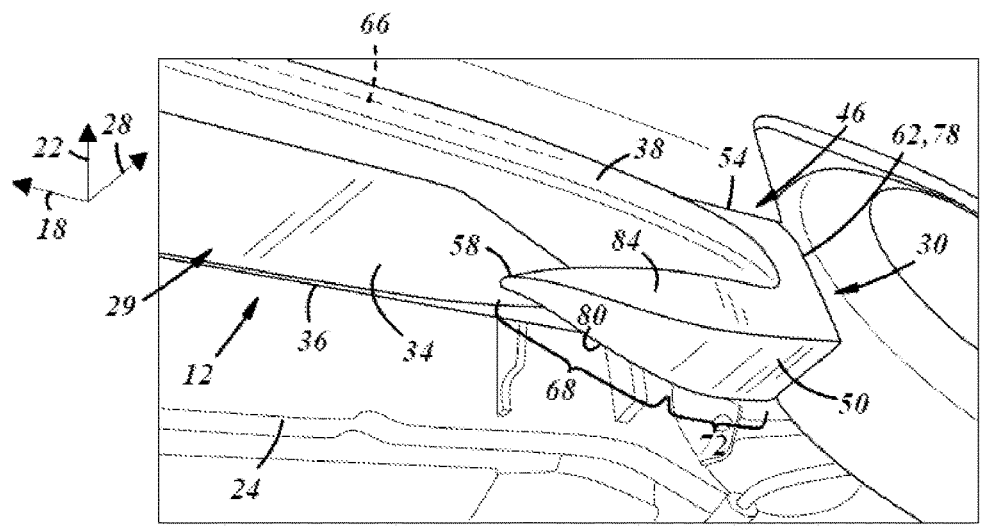
FIG. 2 is a fragmentary, perspective view of a portion of the vehicle and side step, showing a front end of the side step adjacent to a front wheel of the vehicle.
Figure 3:
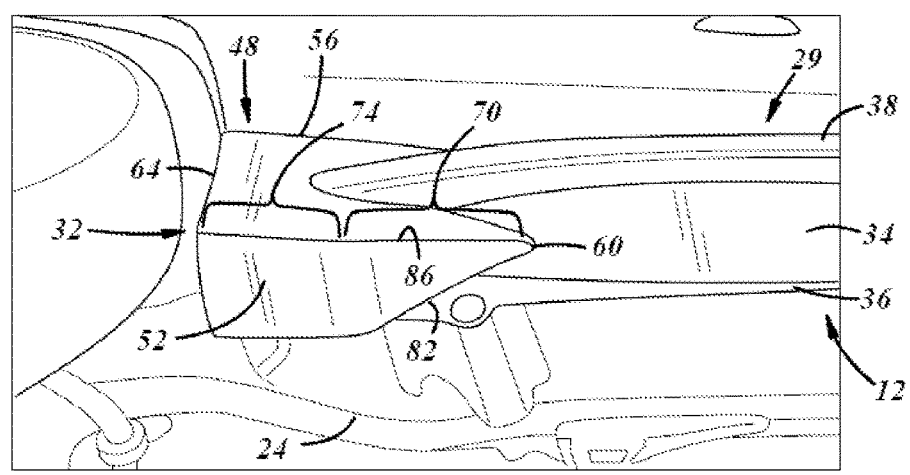
FIG. 3 is a fragmentary, perspective view of a portion of the vehicle and side step, showing a rear end of the side step adjacent to a rear wheel of the vehicle.

Referring in more detail to the drawings, FIG. 1 illustrates a vehicle 10 having a side step 12 located between front wheels 14 and rear wheels 16 of the vehicle 10 that are spaced apart in a fore-aft direction, indicated by arrow 18 in FIGS. 1 and 2. The wheels 14, 16 rotate along a ground surface 20 (FIG. 1) as the vehicle 10 moves. The vehicle 10 may be a passenger vehicle having driver and passenger sides that are laterally spaced apart in a cross-car direction perpendicular to the fore-aft direction, and indicated by arrow 22 in FIG. 2. A passenger compartment may be defined between an upper surface of the vehicle 10 (e.g. roof, not shown), a lower surface 24 of the vehicle 10, and the driver and passenger sides of the vehicle 10, which may include one or more doors 26 (FIG. 1) as is known. A vertical direction is defined between the upper and lower surfaces, perpendicular to the fore-aft and cross-car directions, and is shown by arrow 28 in FIGS. 1 and 2. The side step 12 may be received beneath at least one door 26, adjacent to the lower surface 24 of the vehicle 10, and generally aligned, in the cross-car direction, with the front and rear wheels 14, 16. Only one side of the vehicle 10 is shown in FIG. 1 and, for ease of description, only one side step 12 will be described herein. A similar side step 12 may be provided on the other side of the vehicle 10.

As shown in FIGS. 1-5 the side step 12 includes a main body 29 that extends longitudinally (i.e. in the fore-aft direction) from a front end 30 adjacent to the front wheel 14 to a rear end 32 adjacent to the rear wheel 16. The side step 12 may have any desired longitudinal length and is shown as having both the front end 30 and rear end 32 within 11 inches of the wheels (measured in the fore-aft direction). A bottom side 34 of the side step 12 is adjacent to and faces the ground 20. The bottom side 34 extends longitudinally from the front end 30 to the rear end 32 and laterally (e.g. in the cross-car direction) from an inner side 36 that is adjacent to and may be connected to the vehicle body to an outer side 38 that faces outwardly, away from the vehicle 10 body. A top side 40 of the side step 12 is opposite to the bottom side 34 and faces upwardly, away from the ground 20. The top side 40 may also extend longitudinally from the front end 30 to the rear end 32 and laterally from the inner side 36 to the outer side 38.

The side step 12 may be thicker adjacent to one or both of the front end 30 and rear end 32 than in a central portion 42 (labeled in FIGS. 1 and 5) of the side step 12 including a midpoint 44 between the front end 30 and rear end 32, where the thickness is measured in the vertical direction (e.g. perpendicular to the ground, or perpendicular to both the cross-car and fore-aft directions). The thicker portion or portions may define air guides arranged to control airflow onto and away from the side step 12.

In at least some implementations, a first air guide 46 is provided at or adjacent to the front end 30 of the side step 12 and a second air guide 48 is provided at or adjacent to the rear end of the side step 12. In at least some implementations, the first and second air guides 46, 48 include a lower surface 50, 52 that may define part of the bottom side 34 of the side step 12 and which may have a portion that is inclined, that is, extends at an angle to the bottom side 34 in the central portion 42. Also or instead, one or both of the air guides 46, 48 may include an upper surface 54, 56 that may define part of the top side 40 of the side step 12 and which may be inclined/extend at an angle to the top side 40 in the central portion 42.

In at least some implementations, in the central portion 42 of the side step 12, between the air guides 46, 48, the bottom side 34 and top side 40 may be planar or generally planar (i.e. with a deviation of 1cm or less from a plane extending in the cross-car and for-aft directions and including the midpoint 44 of the respective sides). And the lower surface 50, 52 of one or both air guides 46, 48 may extend downwardly from the central portion 42 of the bottom side 40 and the upper surface 54, 56 of one or both air guides 46, 48 may extend upwardly away from the central portion 42 of the top side 40. The air guides 46, 48 have inward ends 58, 60 located between the front end 30 and rear end 32 of the side step 12, and outward ends 62, 64 at the respective front end 30 or rear end 32 of the side step 12. The length of each air guide 46, 48 between the inward end 58, 60 and outward end 62, 64 is less than 40% of the total length of the side step 12, in at least some implementations, and may be less than 10% of the total length of the side step in some implementations.

In at least some implementations, one or both air guides 46, 48 have a thickest portion that is at least 25% greater, and may be up to 150% greater, than the thickness of a thinnest portion of the side step 12. In the example shown, the thickness of the central portion 42 of the side step 12 (i.e. distance between bottom side 34 and top side 40) is constant, or within 10% of constant, along its longitudinal length. As shown in FIGS. 1-4, the air guide 46, 48 of the side step 12 may have an upper surface 54, 56 a portion of which is inclined at a non-zero angle relative to the top side 40 of the side step 12 spaced from the air guides 46, 48 (e.g. within the central portion 42). The air guides 46, 48 may also or instead have a lower surface 50, 52 that is inclined at a non-zero angle relative to the bottom side 34 of the side step 12 spaced from the air guides 46, 48 (e.g. within the central portion 42). The inclined lower and/or upper surface(s) 50, 52, 54, 56 of an air guide 46, 48 may be arranged at an angle of between 6 and 18 degrees relative to the top side 40 or bottom side 34 of the side step 12 in the central portion 42, or an imaginary centerline 66 (which lies in a plane bisecting the central portion of the side step 12, and is shown in FIG. 2) extending between the top side 40 and bottom side 34.

The inclined surface may extend along the longitudinal length of an air guide, or the air guide may include portions at different angles relative to the longitudinal centerline 66, and the air guides 46, 48 may have portions that are continuously curved and not at a fixed angle but are nonetheless inclined or at a non-zero angle (i.e. not parallel) to the centerline 66. In the example shown in FIGS. 1-5, the air guides 46, 48 include a first section 68, 70 (labeled in FIGS. 2 and 3), respectively, from the inward ends 58, 60 to a point located between the inward and outward ends 58, 60, 62, 64, and a second section 72, 74 (labeled in FIGS. 2 and 3), respectively, that is less steep than the first section 68, 70 and which extends from the first section to the respective outward end 62, 64.

In at least some implementations, the inward end 58, 60 of an air guide 46, 48 defines the minimum thickness or least thick portion of the air guide, and the outward end 62, 64 defines a maximum thickness or thickest portion of the air guide. In this way, the lower surface 50, 52 of an air guide 46, 48 at the inward end is closer to the top side 40 of the side step 12 than is the lower surface 50, 52 at the rear end of the side step (e.g. at the outward end of the air guide 46, 48). And an upper surface 54, 56 of an air guide 46, 48 at the inward end is closer to the bottom side 34 of the side step 12 than is the upper surface of the air guide at the outward end.

Figure 4:
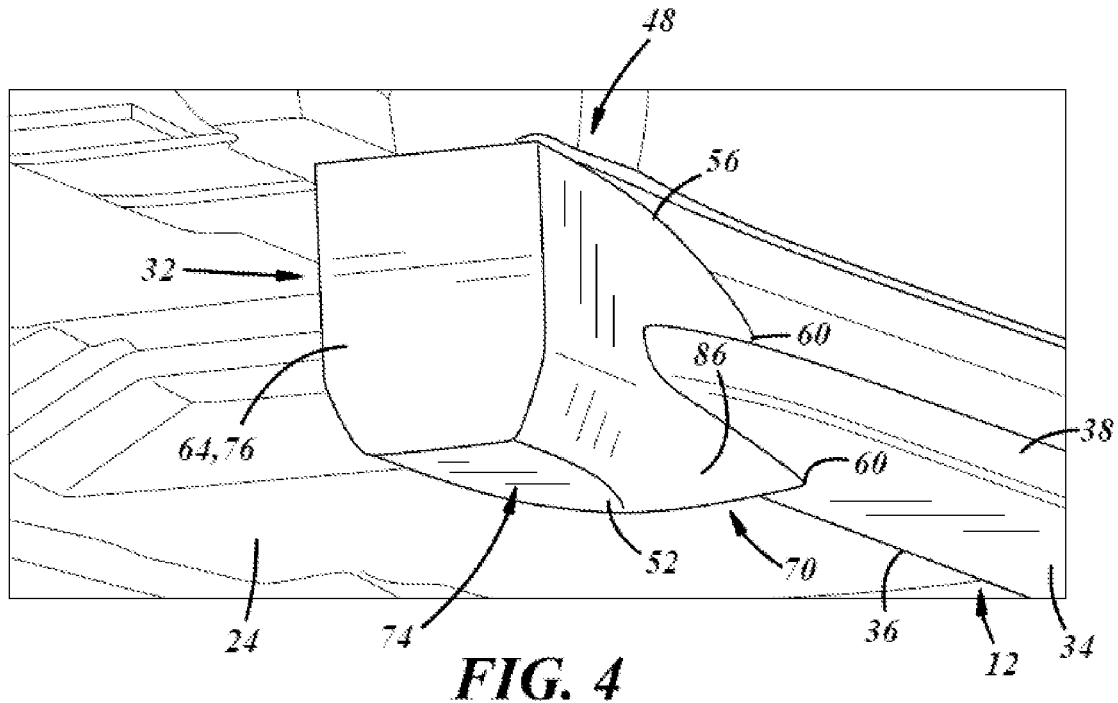
FIG. 4 is a fragmentary, perspective view of a portion of the vehicle and side step, showing a rear surface of the side step.

As shown in FIG. 4, a rear surface 76 of the second air guide 48 and, as shown in FIG. 2, a front surface 78 of the first air guide 46 may blend with an adjacent surface of the vehicle 10 body, and may be generally perpendicular to the longitudinal centerline 66 or within 20 degrees of perpendicular.

In at least some implementations, the inward end 58, 60 of one or both air guides 46, 48 has less width than the outward end 62, 64, where width is measured in the cross-car direction (e.g. between the inner side 36 and outer side 38). Both an inner side 80, 82, and an outer side 84, 86 of the air guides 46, 48, respectively, may be inclined inwardly toward each other in the area of an air guide, or only one of the sides may be tapered, as desired. In FIG. 5, an implementation is shown in which both the first air guide 46 and second air guide 48 include inwardly inclined inner sides 80, 82 and an inwardly inclined outer sides 84, 86, where inwardly denotes that these sides are inclined from the outward end to the inward end toward an imaginary fore-aft extending centerline of the air guides or toward the other of the inner and outer sides. In at least some implementations, the inward end is between 5% and 50% of the width of the outward end. Accordingly, one or both air guides 46, 48 can be tapered in both thickness and width to guide air flow toward and away from the side step 12 in a desired manner and/or to provide a desired appearance of the side step 12.

In at least some implementations, the air guides may be formed integrally with and in the same material as the remainder of the side step 12. Recognizing that the side steps may include multiple materials, for example mounting brackets or other features embedded within a molded shell, the integrally formed side steps may be provided when the shell is molded rather than after the shell is molded. However, the air guides can be formed separately from the remainder of the side step 12 and then connected to the remainder of the side step 12. The side step 12 may include a main body having a central portion and one or more air guides and one or both ends of the central portion. While called a separate term—air guide—these features can simply be thicker portions of the side step 12 body and need not be separate components, as noted above.

A first air guide 46 at the front end 30 of the side step 12 has an end surface 78 at the outward end 62 that is adjacent to the front wheel 14 of the vehicle, with no structure (e.g. just open space/air) between the wheel 14 and at least a majority of the surface area of the end surface 78. When the vehicle 10 is moving, air is directed around the end surface 78 and toward the inward end 58 of the first air guide 46, and toward the central portion 42 of the side step 12. The tapered or inclined surfaces 50, 80, 84 of the first air guide 46 can help to converge air and move air flow beneath and/or above the air step 12 in a smoother manner, with less turbulence, and less resistance. Further, air flowing around the front wheel 14 may be maintained outboard of the side step 12 to reduce drag or turbulent flow that could otherwise be cause by such air moving inward under or against the vehicle 10 after passing the front wheel 14. The improved air handling of the side step 12 can in at least these ways improve the efficiency of the vehicle 10 (e.g. lower energy use to travel at a given rate/distance).

Likewise, as air continues along/about the side step 12, the inward end 60 of the second air guide 48 at the rear end 32 of the side step 12 may include tapered surfaces 52, 82, 86 that tend to diverge the air flow around the second air guide 48, and may do so in a smooth, relatively low turbulence manner. Further, air may be directed outward, around the rear wheel 16 rather than directly into the rear wheel 16 and thereby reduce resistance and turbulent flow at the rear wheel 16. The improved air handling of the side step 12 can in at least these ways improve the efficiency of the vehicle 10 (e.g. lower energy use to travel at a given rate/distance).

Figure 7:
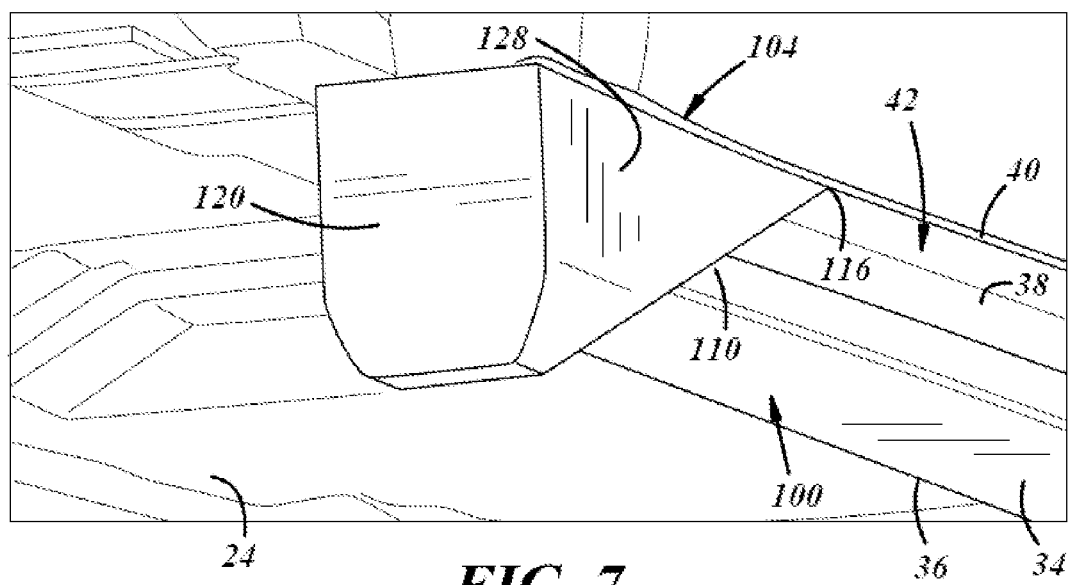
FIG. 7 is a fragmentary, perspective view of a portion of the vehicle and side step, showing a rear surface of the side step of FIG. 6.

FIGS. 6 and 7 show an alternate side step 100 which may be similar to the side step 12 described above. For ease of description, features in side step 100 that correspond to the same or similar features in side step 12 may be given the same reference numerals. Side step 100 includes first and second air guides 102, 104 are provided at a bottom side 34 of the side step main body 107 at or adjacent to the front end 30 and rear end 32. The air guides 102, 104 include lower surfaces 108, 110, respectively, that are uniformly inclined relative to a central portion 42 of the side step 100 from inward ends 114, 116 having minimum thickness to outward ends 118, 120 having maximum thickness. Further, the air guides 102, 104 have inner surfaces 122, 124 and outer surfaces 126, 128 that are not tapered or inclined and so the air guides 102, 104 have a constant width along their longitudinal lengths.

Accordingly, an air guide may be provided at one or both ends of a side step. An air guide may extend upwardly from a top side of a side step, downwardly from a bottom side of the side step, or both. The air guides, along at least part of their longitudinal length, may have a varying thickness, a varying width, or both.

What is claimed is:

1. A side step for a vehicle, comprising:
a main body having an inner side adapted to be coupled to or adjacent to a vehicle body, an outer side opposite to the inner side, a top side, a bottom side opposite to the top side and in assembly on the vehicle arranged facing a ground surface, a front end and a rear end, and the front end is adapted to be arranged closer to a front of a vehicle than the rear end, wherein an air guide is provided at one or both of the front end and the rear end, the air guide projects outwardly from one or both of the top side and bottom side relative to a central portion of the side step that is spaced from the air guide, and the air guide is thicker, in a direction perpendicular to the centerline, at said one or both of the front end and rear end than is the air guide at a location between the front end and rear end, wherein the air guide has an inward end located between the front end of the main body and the rear end of the main body, and an outward end that defines either the front end of the main body or the rear end of the main body, and wherein the inward end has a smaller width, measured in a direction extending between the inner side and the outer side of the main body, than does the outward end.

2. The side step of claim 1 wherein the air guide is provided at the rear end of the main body and the air guide extends downwardly from the bottom side, and a lower surface of the air guide at an inward end, that is located spaced from the rear end of the main body, is closer to the top side of the main body than is the lower surface of the air guide at an outward end at the rear end of the main body.

3. The side step of claim 2 wherein the air guide also extends upwardly from the top side, and an upper surface of the air guide at the inward end is closer to the bottom side of the main body than is the upper surface of the air guide at the outward end.

4. The side step of claim 1 wherein the air guide is provided at the front end of the main body and the air guide extends downwardly from the bottom side, and a lower surface of the air guide at an inward end located spaced from the front end of the main body is closer to the top side of the main body than is the lower surface of the air guide at an outward end at the front end of the main body.

5. The side step of claim 4 wherein the air guide also extends upwardly from the top side, and an upper surface of the air guide at the inward end is closer to the bottom side of the main body than is the upper surface of the air guide at the outward end.

6. The side step of claim 1 wherein the air guide has an inward end located between the front end of the main body and the rear end of the main body, and an outward end that defines either the front end of the main body or the rear end of the main body, and wherein a longitudinal length of the air guide between the inward end and outward end is less than 40% of the length of the main body.

7. The side step of claim 1 wherein the air guide is contoured from the outward end to the inward end, with an inner side of the air guide and an outer side of the air guide inclined inwardly toward each other so that the inward end is spaced from both the inner side of the main body and the outer side of the main body.

8. The side step of claim 7 wherein the inward end is between 5% and 50% of the width of the outward end.

9. The side step of claim 1 wherein the air guide is formed integrally with and in the same material as the main body.

10. The side step of claim 1 wherein the air guide is formed separately from and is connected to the main body.

11. The side step of claim 1 wherein two separate air guides are provided with a first air guide at the front end of the main body and extending part of the way toward the rear end of the main body, and a second air guide at the rear end of the main body and extending part of the way toward the front end of the main body, and the side step has a central portion between the first air guide and second air guide that has a thickness less than the maximum thickness of either air guide.

12. A vehicle, comprising:
a vehicle body;
a front wheel coupled to the vehicle body for rotation relative to the vehicle body;
a rear wheel coupled to the vehicle body for rotation relative to the vehicle body, the rear wheel being spaced from the front wheel;
a side step coupled to the vehicle body and located between the front wheel and rear wheel, the side step having an inner side adjacent to and facing the vehicle body, an outer side opposite to the inner side, a top side, a bottom side opposite to the top side, a front end nearer to the front wheel than the rear wheel, and a rear end nearer the rear wheel than the front wheel, wherein the side step has an air guide at one or both of the front end of the side step and the rear end of the side step, wherein the air guide projects outwardly from both the top side of the side step and the bottom side of the side step relative to a central portion of the side step that is spaced from the air guide, and the air guide is thickest, in a direction perpendicular to bottom side, at said one or both of the front end and rear end than is the air guide at a location between the front end and rear end.

13. The vehicle of claim 12 wherein at least a portion of a lower surface of the air guide includes an angled surface that is at a non-zero angle to the bottom side of the side step in a central portion of the side step, wherein the central portion is located between the front end and rear end.

14. The vehicle of claim 12 wherein at least a portion of an upper surface of the air guide includes an angled surface that is at a non-zero angle to the top side of the side step in a central portion of the side step, wherein the central portion is located between the front end and rear end.

15. The vehicle of claim 13 wherein the angled surface has an inward end located between the front end of the side step and the rear end of the side step, and an outward end that defines either the front end of the side step or the rear end of the side step, and wherein the inward end has a smaller width, measured in a direction extending between the inner side and outer side of the side step, than does the outward end.

16. The vehicle of claim 12 wherein the thicker portion is at the front end of the side step and extends less than 40% of a length of the side step measured between the front end and rear end.

17. The vehicle of claim 12 wherein the air guide is at the rear end of the side step and extends less than 40% of a length of the side step measured between the front end and rear end.

18. A side step for a vehicle, comprising:
a main body having an inner side adapted to be coupled to or adjacent to a vehicle body, an outer side opposite to the inner side, a top side, a bottom side opposite to the top side and in assembly on the vehicle arranged facing a ground surface, a front end and a rear end, and the front end is adapted to be arranged closer to a front of a vehicle than the rear end, wherein an air guide is provided at one or both of the front end and the rear end, the air guide projects outwardly from both the top side and bottom side relative to a central portion of the side step that is spaced from the air guide, and the air guide is thickest, in a direction perpendicular to the centerline, at said one or both of the front end and rear end than is the air guide at a location between the front end and rear end.

19. The side step of claim 18 wherein a lower surface of the air guide at an inward end, that is located spaced from both the front end of the main body and the rear end of the main body, is closer to the top side of the main body than is the lower surface of the air guide at an opposite, outward end of the air guide, and an upper surface of the air guide at the inward end is closer to the bottom side of the main body than is the upper surface of the air guide at the outward end of the air guide.

20. The side step of claim 19 wherein the air guide has an inner side adjacent to the inner side of the main body and the air guide has an outer side adjacent to the outer side of the main body, and the air guide is contoured from the outward end to the inward end with an inner side of the air guide and an outer side of the air guide inclined inwardly toward each other so that the distance between the inner side of the air guide and the outer side of the air guide is less than the distance between the inner side of the main body and the outer side of the main body, and the inward end of the air guide is spaced from both the inner side of the main body and the outer side of the main body.

\* \* \* \* \*